United States Patent [19]
Hickling et al.

[11] 3,892,215
[45] July 1, 1975

[54] ELECTRICALLY HEATED INTAKE MANIFOLD

[75] Inventors: Robert Hickling, Royal Oak, Mich.; Joe W. Posey, Newport News, Va.; Irvin D. Wilken, Sterling Heights, Mich.

[73] Assignee: General Motors Corporation, Detroit, Mich.

[22] Filed: Nov. 7, 1973

[21] Appl. No.: 413,521

[52] U.S. Cl....... 123/122 F; 123/122 R; 123/122 A; 123/52 MV; 219/206; 219/207
[51] Int. Cl............................................. F02m 31/00
[58] Field of Search ........ 123/122 R, 122 F, 122 A, 123/52 MV; 219/206, 207

[56] References Cited
UNITED STATES PATENTS

| 1,006,244 | 10/1911 | Jow | 123/122 F |
| 1,096,989 | 5/1914 | Bentley | 123/122 F |
| 1,211,935 | 1/1917 | Groshans | 123/122 E |
| 1,353,288 | 9/1920 | Stokes | 123/122 F |
| 1,390,101 | 9/1921 | Durham | 219/206 |
| 1,484,617 | 2/1924 | Aske | 219/206 |
| 1,706,623 | 3/1929 | Link | 123/122 A |
| 3,581,722 | 6/1974 | McKellar | 123/52 MV |

FOREIGN PATENTS OR APPLICATIONS

| 146,658 | 7/1920 | United Kingdom | 123/122 F |
| 475,676 | 6/1915 | France | 219/207 |

Primary Examiner—Charles J. Myhre
Assistant Examiner—R. H. Lazarus
Attorney, Agent, or Firm—Robert J. Outland

[57] ABSTRACT

Intake manifolds for internal combustion engines are provided with electrically heated inner walls to avoid condensation of fuel thereon and maintain a proper air-fuel mixture, especially during engine starting and warm up. Arrangements are disclosed for manifold housings, electrical heating elements, and tubular insulators for efficiently using electric energy and minimizing heat loss through the manifold walls.

10 Claims, 20 Drawing Figures

ELECTRICALLY HEATED INTAKE MANIFOLD

FIELD OF THE INVENTION

This invention relates to internal combustion engines of the type fueled by gasoline-air mixtures and, more particularly, to electrically heated intake manifold arrangements for such engines.

BACKGROUND OF THE INVENTION

It is known in the art to heat the intake manifolds of internal combustion engines in order to assist in vaporizing and maintaining in a vaporous state the gasoline fuel in air-fuel mixtures delivered to such manifolds by conventional carburetors or the like. A common method for applying heat is through close association of the inlet and exhaust manifolds of an engine so as to transfer heat from the exhaust gases to the air-fuel mixture through some portion of the intake manifold walls. Additionally, it is known to provide heat directly to the air supplied to the carburetor as well as to provide other means for heating the air within a manifold. Such other means have included electrical heating elements inserted in the manifold passages or extending across the flow paths of the air-fuel mixture.

While all of the foregoing methods have been successful in some degree, the use of exhaust heat, which is the most common method, fails to provide for starting and early portions of the engine warm up period when adequate exhaust heat is not yet available. Additionally, the arrangements of other auxiliary heating devices generally do not provide for quickly heating the inner wall surfaces of the manifold. As a result, gasoline fuel droplets condense on the manifold walls, particularly during starting and warm up, affecting the engine air-fuel mixture ratio and in some cases causing liquid gasoline droplets to be supplied to the cylinders. This may result in incomplete combustion of the gasoline and adversely affect exhaust emissions during the early portions of engine operation.

SUMMARY OF THE INVENTION

The present invention provides means for electrically heating the inner walls of engine intake manifolds to minimize the problem of fuel condensation during starting and warm up. To minimize the electric power requirements, the manifold walls are insulated or formed of a suitable heat insulating material. Electric heating elements are provided in tubular form which extend along the insulated internal walls of the manifold, thus providing directly heated surfaces which minimize fuel condensation. Preferably, insulating air spaces are provided between the insulating members and the manifold walls as well as between the insulating members and the heating elements to reduce heat losses.

These and other details and advantages of the invention will be more fully understood from the following description of certain preferred embodiments taken together with the accompanying drawings.

DESCRIPTION OF THE ILLUSTRATED EMBODIMENTS

Figure 1:
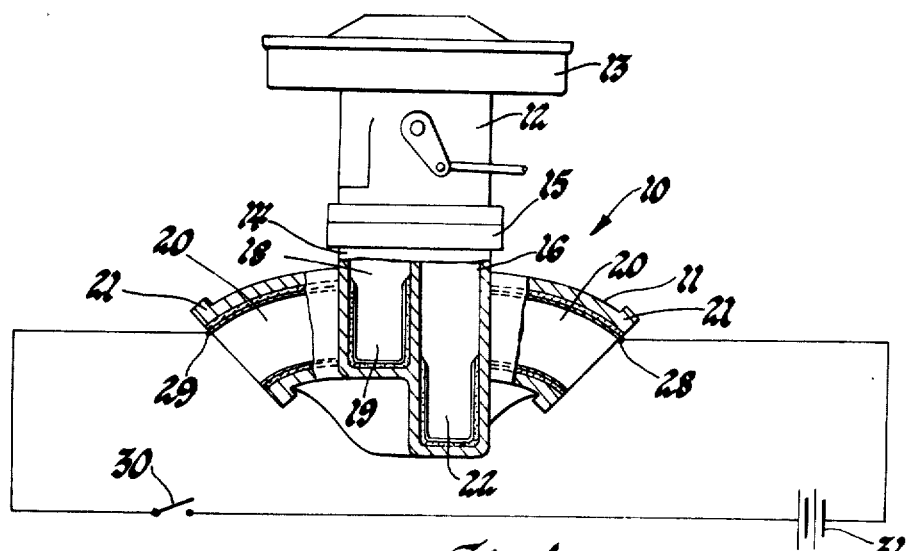
FIG. 1 is a transverse cross-sectional view showing one embodiment of heated intake manifold formed according to the invention and in association with other components of an internal combustion engine.

Referring first to FIG. 1 of the drawings, there is shown an internal combustion engine generally indicated by numeral 10 and including an intake manifold 11 connecting with the cylinder inlet ports, not shown, and supporting a carburetor 12 having mounted thereon an air cleaner and inlet housing 13 of conventional construction. Manifold 11 includes a housing 14 having a mounting boss 15 on which carburetor 12 is mounted and through which there are openings connected with a pair of plenum chambers 16, 18 adjacent to the mounting boss.

Plenum chamber 18 connects with a longitudinally extending passage 19 which in turn connects with a pair of transversely extending runners 20 at each end, only one such pair being shown. Runners 20 extend through flanges 21 of the manifold housing which are utilized to secure the manifold to the engine cylinder heads, not shown. Plenum chamber 16 in turn connects with a longitudinally extending passage 22 which likewise connects at its ends with transversely extending runners, not shown, connectible through the flanges 21 with other inlet ports of the engine.

Figure 5:
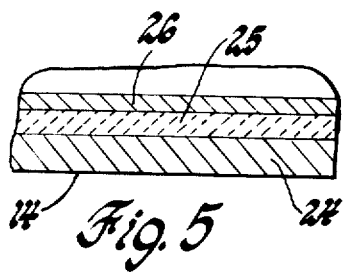
FIG. 5 is a cross-sectional detail view showing an exemplary form of wall construction for manifold of the type shown in FIG. 1.

The makeup of the manifold runner and passage walls, as best shown in the enlarged view of FIG. 5, includes cast outer walls 24 in the housing 14. The outer walls are lined by an insulating layer 25 such as ceramic foam which is in turn covered on its interior surface by an electrically conducting resistance material 26, such as steel, capable of being heated upon passage of an electric current therethrough. The material 26 forms an electric heating element and covers the inner walls of the manifold runners 20 and longitudinal passages 19, 22, being electrically insulated from the housing walls 24 by the insulating layer 25. Appropriate points 28, 29 at the ends of the heating elements 26 are electrically connected through a switch 30 with an external source of electrical power, such as battery 31, so as to provide means for supplying electricity to the heating elements.

In operation, switch 30 is arranged to be closed a short interval in advance of starting the engine so that electrical current is supplied to the heater elements to warm the walls of the manifold passages before the engine is started. Alternatively, however, switch 30 may be closed upon closing of the engine starter switch or, if preferred, may be arranged to close only after the engine actually starts. In any event, the supply of electrical current to the heater elements warms the wall surfaces of the manifold so that condensation of fuel thereof is minimized, and the cylinders of the engine are supplied with a proper air-fuel mixture.

Figure 2:
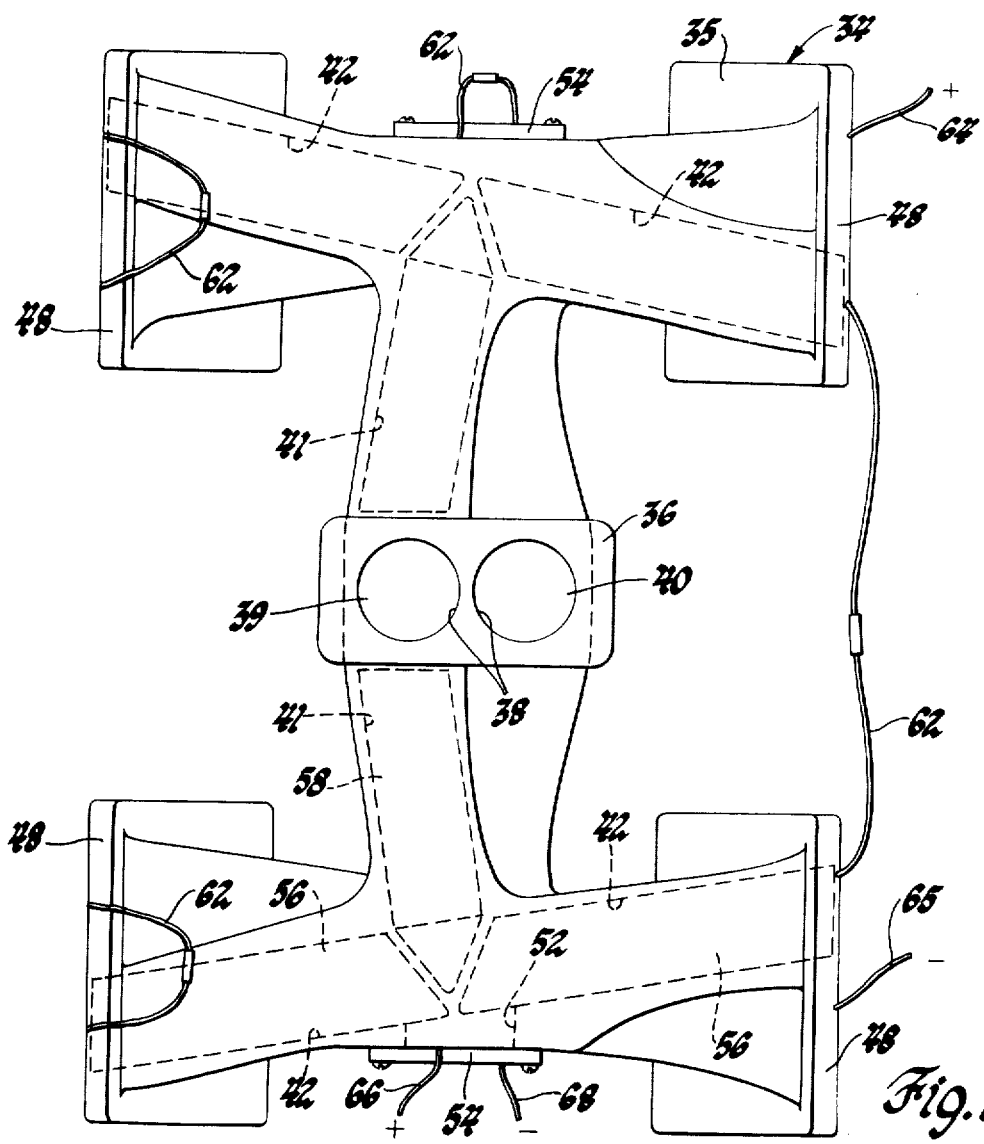
FIG. 2 is a plan view of an alternative embodiment of heated intake manifold formed according to the invention.
Figure 3:
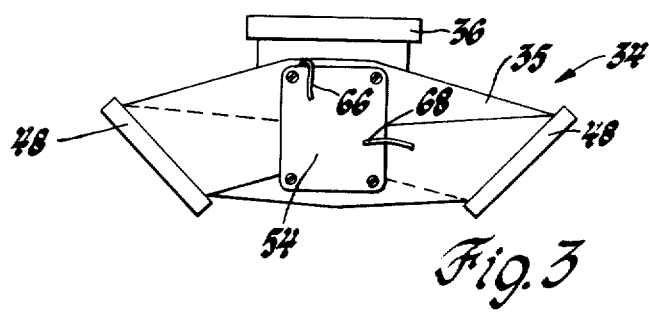
FIG. 3 is an end view of the intake manifold of FIG. 2.
Figure 4:
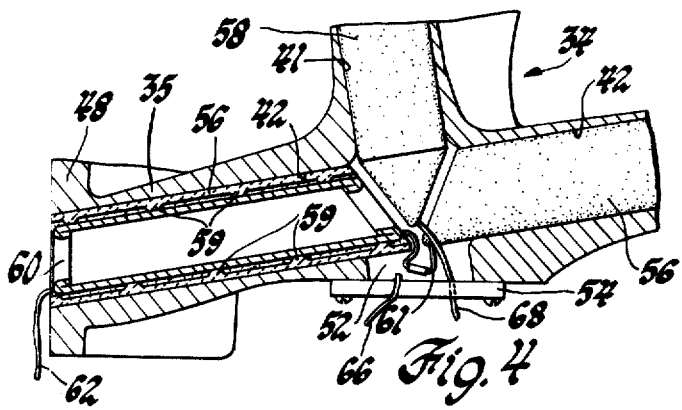
FIG. 4 is a fragmentary cross-sectional view of a portion of the manifold of FIGS. 2 and 3 showing certain details thereof.

FIGS. 2–4 illustrate another embodiment of manifold for use particularly in a V-8 type engine and generally indicated by numeral 34. Manifold 34 comprises a housing 35, which may be formed of cast iron or the like and including a carburetor mounting boss 36 having a pair of openings 38 therethrough connecting with separate plenum chambers 39 and 40 therebelow. Plenum chamber 39 connects with generally longitudinally extending passages 41 which in turn connect at their outer ends with laterally extending runners 42. Plenum chamber 40 likewise connects with similar longitudinally and laterally extending passages and runners, not shown.

The ends of the runners open at individual ports, not shown, through flanged mounting bosses 48 provided on the manifold housing. At the ends of the housing there are openings 52 which connect with the ends of the longitudinal passages 41 to permit installation of inserts as will be subsequently described. These openings 52 are closed by cover plates 54. The longitudinal passages 41 and the runners 42 are preferably made straight to provide for reception of the inserts. It would be possible to use passages and runners formed in simple curves and apply matching curved inserts, if desired.

As best shown in FIG. 4, the inner walls of the runners and longitudinal passages are respectively lined by insulating members 56, 58 which may be formed of cast ceramic foam or other suitable material. Insulating members 56 are separately formed and are inserted into the various runners 42 through the open ends thereof after casting of the manifold housing. Insulating members 58 are likewise separately formed and are inserted into the longitudinal passages 41 through the adjacent openings 52 in the ends of the manifold housing.

The insulating members 56, 58 are provided on their inner surfaces with ribs 59 which support interiorly thereof tubular electrical heating elements 60. Elements 60 are electrically connected by internal and external connecting wires 61, 62 to form a pair of electrical circuits, one of which interconnects the heating elements in runners 42 and terminates in electrical terminals 64 and 65, and the other of which interconnects the heating elements in passages 41 and terminates in electrical terminals 66 and 68. The arrangement provides connections for the supply of electrical current to the heating elements through two parallel circuits. In addition, the retention of heat generated by the elements within the manifold passages and runners is maximized by the air spaces formed between the elements 60 and the insulating members 56 through the use of the raised ribs or spacers 59.

Figure 6:
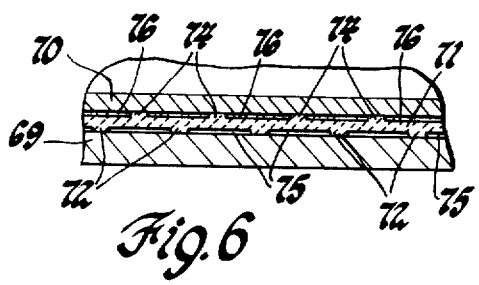
FIG. 6 is a detail cross-sectional view showing an alternative embodiment of an insulating member installed in a manifold of the type shown in FIGS. 2–4.
Figure 7:
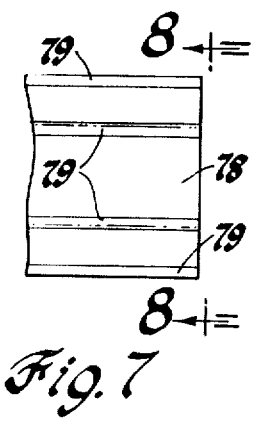
FIG. 7 is a fragmentary side view illustrating one form of insulator construction.
Figure 8:
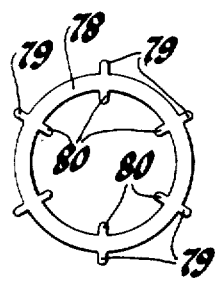
FIG. 8 is an end view of the insulator of FIG. 7.

FIG. 6 shows a portion of a manifold having a housing 69 and heating elements 70 constructed similarly to the manifold of FIGS. 2–4. The arrangement differs, however, in the construction of the insulating members 71 which separate the housing and heating elements. Members 71 are preferably formed of hard ceramic foam and include both external ribs or projections 72 and internal ribs or projections 74 which extend into contact with the inner walls of the housing and the heating elements, respectively. Between the ribs 72, 74 there are provided air spaces 75, 76. These increase the insulating effect of the construction and thereby minimize heat transfer from the mixture flow paths within the heating elements 70 to the external walls of the housing 69.

Figure 9:
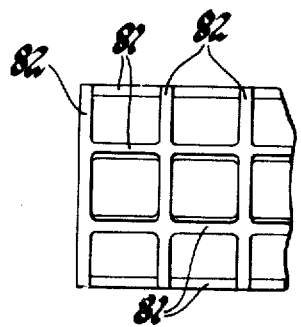
FIGS. 9–11 are fragmentary side views of various alternative embodiments of insulators.
Figure 10:
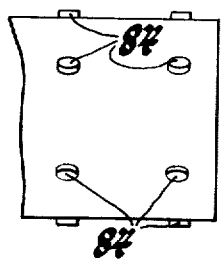
Figure 11:
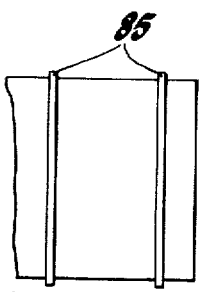

FIGS. 7–11 illustrate insulating members having various forms of ribs or other spacing projections. The embodiment of FIGS. 7 and 8 includes a tubular body 78 preferably formed of foam ceramic and including longitudinally extending external and internal ribs 79 and 80, respectively. In the embodiment of FIG. 9 the tubular body is provided with both longitudinal and circumferential ribs 81 and 82, respectively. The embodiment of FIG. 10 shows small projections 84 from the exterior surface of the tubular body which act as spacing means in the manner of the ribs of the previously disclosed embodiments. In the embodiment of FIG. 11 only circumferential ribs 85 are utilized. In each case it should be understood that similar projections or ribs could be provided on the interiors of any of the tubular bodies so as to provide air spaces between the heating element and the insulator in the same manner as spacing ribs are provided on the exterior to provide air spaces between the insulating members and the manifold housing.

Figure 12:
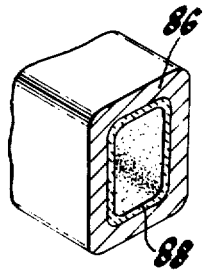
FIGS. 12–14 are pictorial views of various embodiments of manifold wall constructions.
Figure 13:
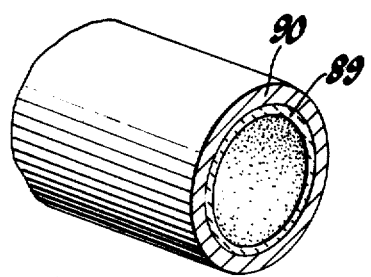
Figure 14:
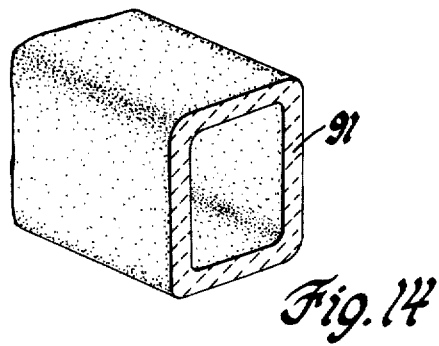

FIGS. 12–14 show various alternative manifold wall constructions. In FIG. 12 the manifold walls 86 are formed of metal such as cast iron with the internal passages being covered by an insulating layer 88 in the form of a ceramic glaze. FIG. 13 shows an arrangement in which the ceramic insulator 89 is formed first as a separate member, and then the manifold housing 90 is cast around the insulator. In such a construction the housing itself may be formed of metal such as aluminum or of a suitable plastic. FIG. 14 shows a manifold wherein the housing 91 is itself formed of a material having low electrical conductivity, such as plastic. A thermal insulating layer of air may be formed between the manifold walls and the heater elements subsequently installed therein by adding projections to one of them.

Figure 15:
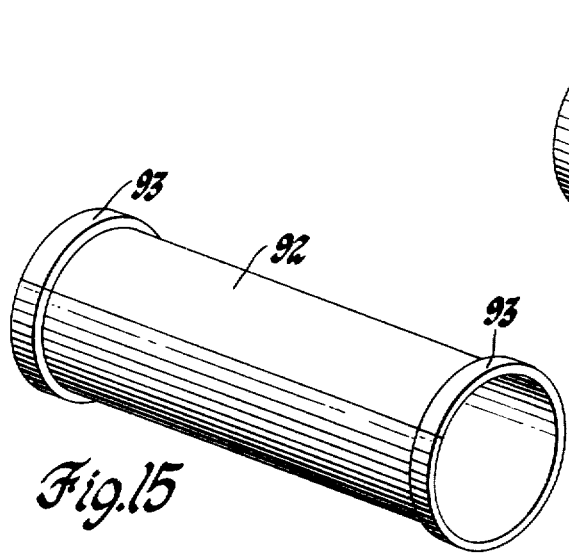
FIGS. 15–17 are pictorial views showing alternative heating element arrangements.
Figure 16:
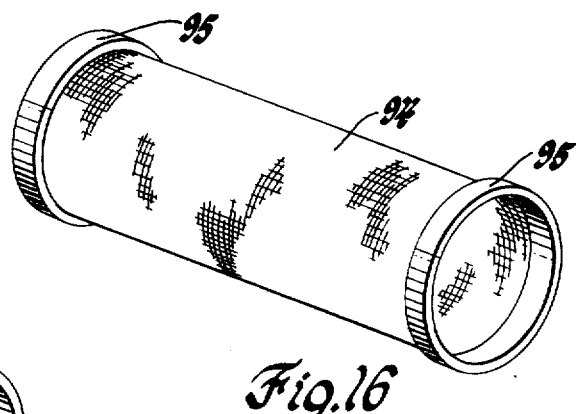
Figure 17:
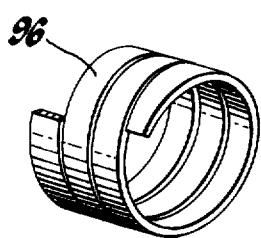

FIGS. 15–17 illustrate various forms of electrical heating elements. FIG. 15 shows an element formed by rolling or bending a thin sheet of metal into a tubular element 92 having rolled collar portions 92 on the ends for spacedly supporting the element within a manifold passage. FIG. 16 shows a similar construction wherein the main body 94 of the heating element is formed of a fine wire mesh of, for example, stainless steel. The arrangement includes spacer collars 95 on each end of the tubular body. Preferably the wire mesh would be made fine to prevent fuel droplets from passing therethrough. FIG. 17 illustrates how a tubular heating element 96 may be formed by a coil made of a flat strip steel or the like.

Figure 18:
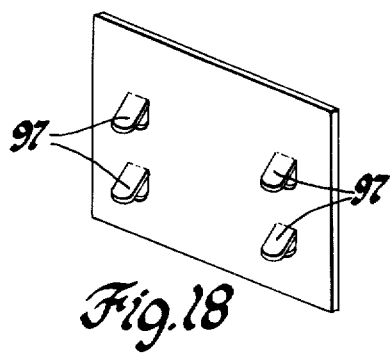
FIGS. 18–20 are fragmentary pictorial views showing details of certain forms of heating elements including various spacer projections formed thereon.
Figure 19:
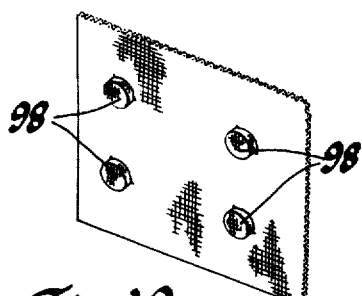
Figure 20:
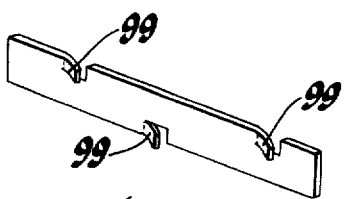

FIGS. 18–20 show various forms of projections formed in the material of the heating elements which could be utilized as means to space the elements in the walls of the associated insulating members. In FIG. 18 tabs 97 are bent outwardly from a solid sheet body of the type shown in the embodiment of FIG. 15. In FIG. 19 projections 98 comprise formed portions of a wire screen element of the type shown in FIG. 16. In FIG. 20 tabs 99 are bent outwardly from the edges of a steel strip of the type shown in the embodiment of FIG. 17.

The various embodiments and alternative constructions illustrated indicate some of the many variations in construction which might be utilized to form intake manifolds having insulated and electrically heated internal passages for distribution of gasoline fuel-air mixtures from a carburetor to the associated engine cylinders. The provision of practical heating means for the passage walls minimizes the condensation of fuel droplets during engine starting and warm up and, accordingly, improves both engine operation and control exhaust emissions.

While the invention has been described by reference to a number of specific embodiments, it is recognized that the numerous changes could be made within the scope of the inventive concepts disclosed without departing from the teachings of this specification. Accordingly, the invention is intended to be limited only by the language of the following claims.

What is claimed is:

1. A heated intake manifold for an internal combustion engine said manifold comprising
    a housing including passage defining means forming a plurality of connecting passages terminating in individual runners adapted to be connected to the respective inlet ports of an associated engine, the portion of said passage defining means forming at least the inner surfaces of said individual runners being made of an electrical and heat insulating material,
    an electrical heating element in each of said runners, each said element comprising a thin walled tube insertable in its respective runner and covering a major portion of the wall surface thereof so as to define paths for air-fuel mixture to flow within said heating elements and prevent contact of at least a major portion of the air-fuel mixture passing through said manifold with the walls of said runners, and
    spacing means maintaining an insulating clearance between substantial portions of the walls of said heating elements and said passage defining means.

2. An engine intake manifold comprising
    a housing defining a plurality of connecting passages terminating in individual runners connectible to the inlet ports of an associated engine,
    tubular insulating members disposed within said runners and covering the inner walls thereof, said members being made of electrical and heat insulating material,
    electrical heating elements of tubular construction extending within said runners along the inner surfaces of said insulating members to define air-fuel mixture flow passages internally of said heating elements, said heating elements being connectible to an electric power source to heat said elements so as to prevent condensation of fuel vapor on said runner walls, and
    spacer means radially spacing the electrical heating elements from the insulating members to provide heat-insulating air spaces between the walls thereof.

3. The manifold of claim 2 wherein said spacer means are formed as inwardly projecting portions of said tubular insulating means.

4. The manifold of claim 2 wherein said spacer means are formed as outwardly projecting portions of said electrical heating elements.

5. A manifold as defined in claim 3 wherein said insulating means further include outwardly projecting spacer means to radially space said insulating members from their respective runner walls and thereby provide additional heat-insulating air spaces between the walls of said runners and said electrical heating elements.

6. The manifold of claim 2 wherein said electrical heating elements are formed primarily as a fine mesh stainless steel screen.

7. The manifold of claim 2 wherein said electrical heating elements are formed primarily as thin sheet metal bodies.

8. The manifold of claim 2 wherein said electrical heating elements are formed from flat metal strip wound in a tubular coil.

9. An intake manifold for an internal combustion engine, said manifold comprising
    a housing including carburetor mounting means and a plenum adjacent thereto for receiving fuel-air mixture through said mounting means, main passage means defining mixture flow passages extending generally longitudinally from said plenum and lateral runners defining connecting passages extending generally laterally from said mixture flow passages and terminating in flanged portions connectible with the inlet ports of an associated engine, said housing having access openings in the end walls thereof in alignment with said longitudinal mixture flow passages and removable cover means closing said access openings.
    tubular insulators in said longitudinal passages and lateral runners,
    tubular passage defining electrical heating elements in said insulators,
    said insulators and said heating elements being formed as separate elements and subsequently installed in said housing through said access openings and the open ends of said runners, said heating elements coacting to define nearly continuous flow passages for fuel-air mixtures from said plenum chamber to the ends of said runners, and
    means electrically connecting said heating elements in at least one electrical circuit for connection to a source power.

10. In an engine intake manifold, a housing having means for mounting a carburetor,
    a plenum chamber in said housing and opening through said mounting means for receiving gasoline fuel-air mixtures therethrough,
    fuel distribution passages in said housing extending from said plenum to openings connectible with the inlet ports of an associated engine,
    electrical heating means substantially covering the inner surfaces of said passages and defining flow paths for the fuel-air mixtures therethrough, and
    thermal insulation means between said electrical heating means and the inner walls of said housing passages to minimize heat loss through said passage walls during operation of said electrical heating means.

* * * * *